US010907834B2

(12) United States Patent
Park

(10) Patent No.: US 10,907,834 B2
(45) Date of Patent: Feb. 2, 2021

(54) SLINGER COMBUSTOR HAVING MAIN COMBUSTION CHAMBER AND SUB-COMBUSTION CHAMBER, AND GAS TURBINE ENGINE SYSTEM HAVING THE SAME

(71) Applicant: HANWHA AEROSPACE CO., LTD., Changwon-si (KR)

(72) Inventor: Soo Youl Park, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 432 days.

(21) Appl. No.: 15/609,354

(22) Filed: May 31, 2017

(65) Prior Publication Data

US 2018/0003388 A1    Jan. 4, 2018

(30) Foreign Application Priority Data

Jul. 1, 2016   (KR) .......................... 10-2016-0083535

(51) Int. Cl.
*F23R 3/38*     (2006.01)
*F23R 3/26*     (2006.01)
(Continued)

(52) U.S. Cl.
CPC ................ *F23R 3/38* (2013.01); *F02C 7/228* (2013.01); *F02C 7/262* (2013.01); *F23R 3/26* (2013.01);
(Continued)

(58) Field of Classification Search
CPC .... F23R 3/38; F23R 3/56; F23R 3/343; F23R 3/34; F23R 3/50; F23R 2900/00009; F23R 2900/03282; F23R 2900/343; F23D 2900/00014; F23D 14/26; F23D 14/725; F23D 14/64; F02C 7/262; F02C 7/264; F02C 7/26; F02C 7/266; F02C 3/16; F23Q 9/10
See application file for complete search history.

(56) References Cited

U.S. PATENT DOCUMENTS 5,265,425 A    11/1993 Howell
5,755,090 A *  5/1998 Hu ......................... F02C 7/262
                                                60/39.091
(Continued)

FOREIGN PATENT DOCUMENTS

CN    202852885 U  *  4/2013
CN    202852885 U     4/2013
(Continued)

*Primary Examiner* — Craig Kim
*Assistant Examiner* — Stephanie Cheng
(74) *Attorney, Agent, or Firm* — Sughrue Mion, PLLC

(57) ABSTRACT

A slinger combustor includes; a first compressed air line connected to a compressor and configured to supply compressed air; a first fuel line connected to a fuel storage and configured to supply fuel; a rotation shaft configured to rotate and inject the fuel supplied from the first fuel line; a main combustion chamber configured to receive the fuel injected from the rotation shaft and receive the compressed air from the first compressed air line; and a sub-combustion chamber configured to selectively discharge a flame generated in an inner space of the sub-combustion chamber to the main combustion chamber.

7 Claims, 4 Drawing Sheets

(51) Int. Cl.
   *F02C 7/228*   (2006.01)
   *F23R 3/34*    (2006.01)
   *F02C 7/262*   (2006.01)
   F23D 14/72     (2006.01)
   F02C 7/264     (2006.01)

(52) U.S. Cl.
   CPC ............... *F23R 3/34* (2013.01); *F02C 7/264* (2013.01); *F23D 14/725* (2013.01); *F23D 2900/00014* (2013.01)

(56) References Cited

U.S. PATENT DOCUMENTS

| | | | |
|---|---|---|---|
| 7,284,378 B2 * | 10/2007 | Amond, III | F23R 3/286 60/776 |
| 7,762,072 B2 | 7/2010 | Critchley et al. | |
| 7,966,820 B2 * | 6/2011 | Romoser | F23R 3/286 60/742 |
| 8,082,724 B2 * | 12/2011 | Hirata | F23N 1/002 60/39.37 |
| 8,479,492 B2 * | 7/2013 | Patel | F02C 3/16 60/243 |
| 9,927,125 B2 * | 3/2018 | Carrere | F02C 3/14 |
| 2013/0327054 A1 | 12/2013 | Patel et al. | |

FOREIGN PATENT DOCUMENTS

| | | | | |
|---|---|---|---|---|
| CN | 104005853 A | * | 8/2014 | |
| GB | 628366 A | * | 8/1949 | ............. F02C 6/003 |
| JP | 5-203147 A | | 8/1993 | |

\* cited by examiner

SLINGER COMBUSTOR HAVING MAIN COMBUSTION CHAMBER AND SUB-COMBUSTION CHAMBER, AND GAS TURBINE ENGINE SYSTEM HAVING THE SAME

CROSS-REFERENCE TO THE RELATED APPLICATION

This application claims priority from Korean Patent Application No. 10-2016-0083535, filed on Jul. 1, 2016, in the Korean Intellectual Property Office, the disclosure of which is incorporated herein in its entirety by reference.

BACKGROUND

1. Field

Apparatuses consistent with exemplary embodiments relate to a slinger combustor and a gas turbine engine system having the same.

2. Description of the Related Art

A gas turbine is a heat engine for driving a turbine by using a combustion gas of high temperature and high pressure, and may generally include a compressor, a combustor, and a turbine. In the gas turbine, air is compressed by using a compressor and then fuel is injected and combusted in a combustor so that air of high-temperature and high-pressure expands in a turbine and generates a driving force.

A slinger combustor may combust fuel by injecting fuel in a radial direction. The slinger combustor mixes compressed air input into the combustion chamber and the fuel injected in the radial direction, and ignites a mixture of the air and the fuel generating a flow of high temperature and high pressure. This flow is moved to a turbine, and blades of the turbine are rotated to generate a driving force.

Since the slinger combustor injects fuel while a rotation shaft rotates at high speed, it is required to maintain a high-speed rotation state. In other words, in order to have the fuel widely distributed in the combustion chamber, the rotation speed of the rotation shaft may need to be maintained in a high-speed state.

SUMMARY

One or more embodiments provide a slinger combustor having an improved re-ignition performance and a gas turbine engine system having the slinger combustor.

Various aspects of the exemplary embodiments will be set forth in part in the description which follows and, in part, will be apparent from the description, or may be learned by practice of these exemplary embodiments.

According to one or more embodiments, there is provided a slinger combustor which may include: a first compressed air line connected to a compressor and configured to supply compressed air; a first fuel line connected to a fuel storage and configured to supply fuel; a rotation shaft configured to rotate and inject the fuel supplied from the first fuel line; a main combustion chamber configured to receive the fuel injected from the rotation shaft and receive the compressed air from the first compressed air line; and a sub-combustion chamber configured to selectively discharge a flame generated in an inner space of the sub-combustion chamber to the main combustion chamber.

During combustion in the main combustion chamber, the compressed air may be supplied to the main combustion chamber by passing through the sub-combustion chamber, and during a flameout in the main combustion chamber, the sub-combustion chamber may generate a flame and discharges the flame to the main combustion chamber.

The sub-combustion chamber may prevent the supply of the compressed air during the generation of the flame.

The slinger combustor may further include a second compressed air line having one end branched from the first compressed air line and an opposite end connected to the sub-combustion chamber, and a second fuel line having one end branched from the first fuel line and an opposite end connected to the sub-combustion chamber.

The sub-combustion chamber may be arranged to face a nozzle of the rotation shaft for injecting the fuel.

The sub-combustion chamber may include a first valve controlling a supply of the compressed air to the sub-combustion chamber, a second value controlling a supply of the fuel to the sub-combustion chamber, and an ignition plug generating a flame.

According to one or more embodiments, there is provided a gas turbine engine system which may include the above slinger combustor, the compressor, the fuel storage arranged spaced apart from the compressor, and a turbine connected to an outlet of the slinger combustor to receive air generated by combusting the fuel in the main combustion chamber.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
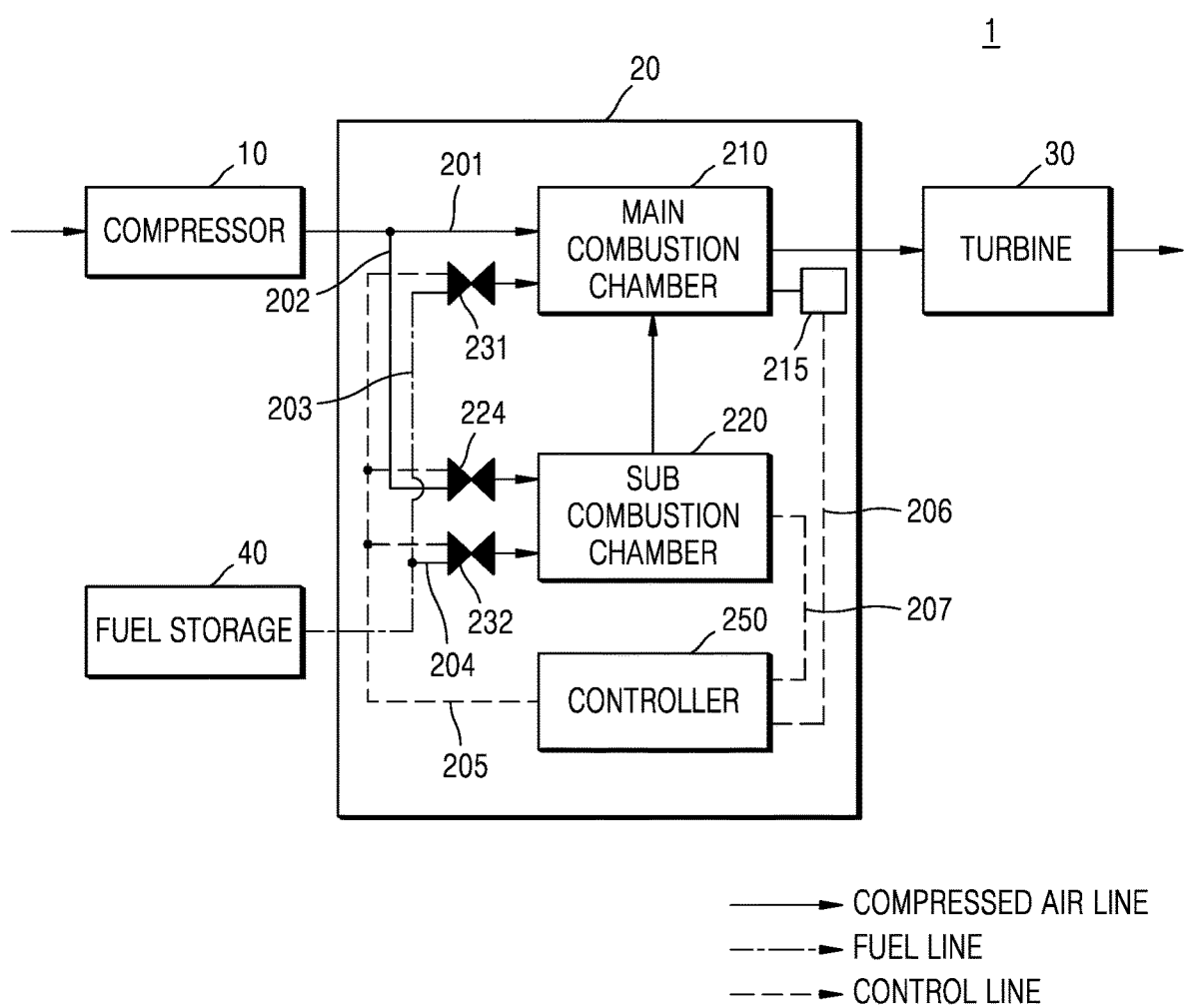
FIG. 1 is a block diagram of a gas turbine engine system, according to an exemplary embodiment.

Reference will now be made in detail to exemplary embodiments which are illustrated in the accompanying drawings, wherein like reference numerals refer to like elements throughout. In this regard, these exemplary embodiments may have different forms and should not be construed as being limited to the descriptions set forth herein. Accordingly, the exemplary embodiments are merely described below, by referring to the drawings, to explain aspects of the present description. Terms used in the present specification are used for explaining a specific exemplary embodiment, not for limiting the present inventive concept. Thus, the expression of singularity in the present specification includes the expression of plurality unless clearly specified otherwise in context. Also, terms such as "comprise" and/or "comprising" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof. In the present specification, terms such as "first" and "second" are used herein merely to describe a variety of members, parts, areas, layers, and/or portions, but the constituent elements are not limited by the terms.

As used herein, the term "and/or" includes any and all combinations of one or more of the associated listed items. Expressions such as "at least one of," when preceding a list of elements, modify the entire list of elements and do not modify the individual elements of the list.

Figure 2:
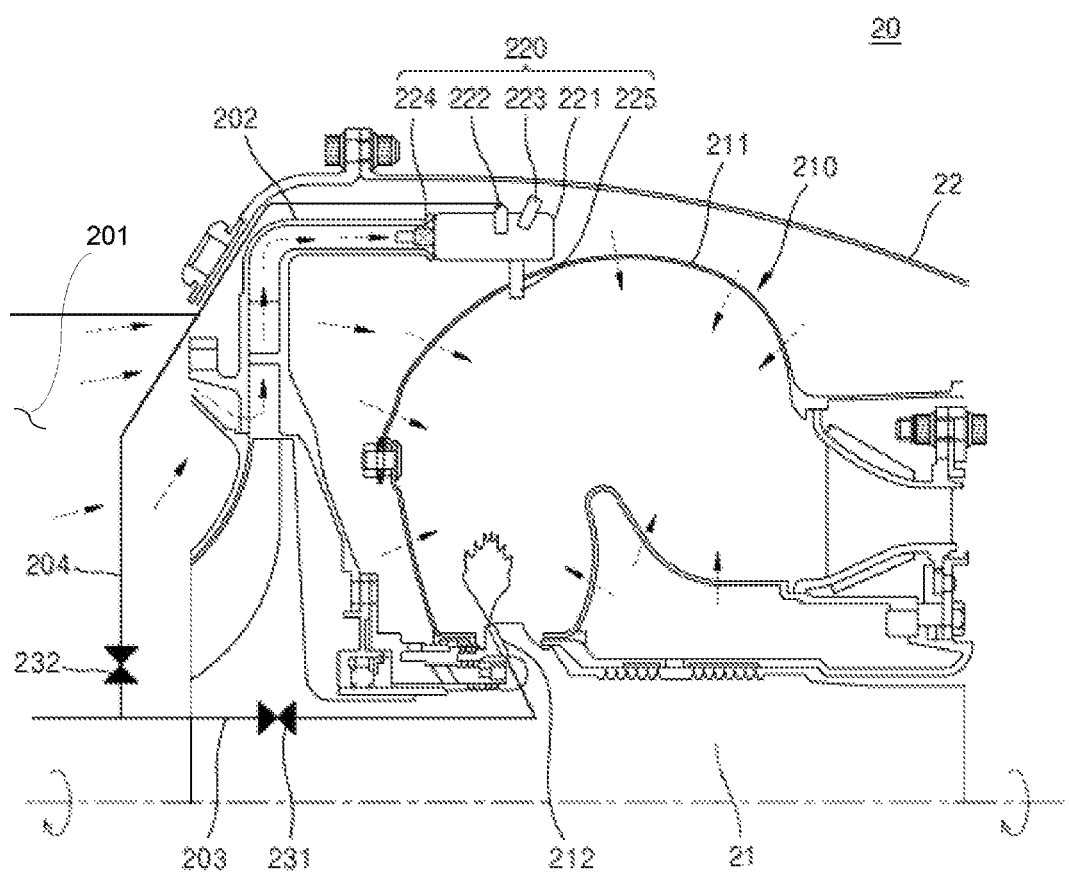
FIG. 2 is a cross-sectional view of a slinger combustor of FIG. 1, according to an exemplary embodiment.

FIG. 1 is a block diagram of a gas turbine engine system 1, according to an exemplary embodiment. FIG. 2 is a cross-sectional view of a slinger combustor 20 of FIG. 1, according to an exemplary embodiment.

Referring to FIGS. 1 and 2, the gas turbine engine system 1 may include a compressor 10, a slinger combustor 20, a turbine 30, and a fuel storage 40.

The compressor 10 may supply compressed air to the slinger combustor 20. The turbine 30 is connected to an outlet of the slinger combustor 20, and may generate a driving force by receiving a fluid with high-temperature and high-pressure from the slinger combustor 20. The fuel storage 40 may store fuel supplied to the slinger combustor 20.

The compressor 10, the slinger combustor 20, and the turbine 30 may be serially arranged along a first direction that is a longitudinal direction of the gas turbine engine system 1. The compressor 10 may be driven, or a rotation shaft 21 of the slinger combustor 20 may be rotated, by using the driving force generated by the turbine 30. The compressor 10 and the turbine 30 may be respectively replaced with a compressor and a turbine which are well known and typically used in the technical field of gas turbine engines, a detailed description thereof is omitted.

The slinger combustor 20 may include the rotation shaft 21, a housing 22, a first compressed air line 201, a second compressed air line 202, a first fuel line 203, a second fuel line 204, a main combustion chamber 210, a sub-combustion chamber 220, and a controller 250. Here, the controller 250 may be implemented by at least one hardware processor, at least one software module, firmware and/or a combination thereof.

The rotation shaft 21 may rotate around an axis in the first direction and inject fuel in a radial direction. The rotation shaft 21 is connected to the turbine 30 to receive the driving force from the turbine 30. The first fuel line 203 extends inside the rotation shaft 21, and an exit end of the first fuel line 203 is connected to a nozzle 212 so that the fuel may be injected to the main combustion chamber 210 during the rotation of the rotation shaft 21.

The first compressed air line 201 may connect the compressor 10 and the main combustion chamber 210. Through the first compressed air line 201, air compressed by the compressor 10 may be supplied to the main combustion chamber 210, and combusted compressed air may be moved to the turbine 30. A partial section of the first compressed air line 201 may extend along the rotation shaft 21.

The second compressed air line 202 is branched from the first compressed air line 201, and may supply the compressed air to the sub-combustion chamber 220. An opening/shutting valve 224 may control an amount of the compressed air supplied to the sub-combustion chamber 220.

The fuel may be supplied from the fuel storage 40 to the main combustion chamber 210 through the first fuel line 203. The first fuel line 203 may extend along the rotation shaft 21 of the slinger combustor 20, and an exit end of the first fuel line 203 may be connected to the nozzle 212 of the rotation shaft 21. A first valve 231 is arranged on the first fuel line 203 and may control an amount of the fuel supplied to the main combustion chamber 210.

The second fuel line 204 is branched form the first fuel line 203, and the fuel may be supplied to the sub-combustion chamber 220 through the second fuel line 204. A second valve 232 is arranged on the second fuel line 204 and may control an amount of the fuel supplied to the sub-combustion chamber 220.

The main combustion chamber 210 is arranged adjacent to the rotation shaft 21, and the fuel injected from the nozzle 212 of the rotation shaft 21 may be supplied to the main combustion chamber 210. The main combustion chamber 210 is arranged surrounding the rotation shaft 21, and an outlet end of the main combustion chamber 210 is connected to the turbine 30 so that the fluid of high-temperature and high-pressure combusted in the main combustion chamber 210 may be supplied to the turbine 30.

The main combustion chamber 210 may include a plurality of openings (not shown) formed in a cover, and the compressed air may be supplied to the main combustion chamber 210 through the openings. In other words, the compressed air moving along the first compressed air line 201 may be supplied to the main combustion chamber 210 by passing through the openings.

The sub-combustion chamber 220 may be arranged at a side of the main combustion chamber 210. The sub-combustion chamber 220 may discharge a flame generated in the sub-combustion chamber 220 toward the main combustion chamber 210. The sub-combustion chamber 220 may include a sub-combustion room 221, a fuel injection part 222, an ignition plug 223, the opening/shutting valve 224, and an injector 225.

The sub-combustion room 221 may move the compressed air supplied from the second compressed air line 202 to the main combustion chamber 210. Furthermore, a flame may be generated by igniting the compressed air stored in the sub-combustion room 221.

The fuel injection part 222 may be connected to the second fuel line 204, and to supply the fuel to the sub-combustion room 221 to ignite the compressed air stored therein.

The ignition plug 223 is arranged adjacent to the fuel injection part 222, and the flame may be generated when an ignition signal 207 is received from the controller 250.

The opening/shutting valve 224 is connected to the second compressed air line 202 and, when the opening/shutting valve 224 is open, the compressed air may be moved to the main combustion chamber 210 through sub-combustion room 221. When the opening/shutting valve 224 is shut off, the flame may be generated in the sub-combustion room 221.

The injector 225 may move the compressed air to the main combustion chamber 210 or the generated flame to the main combustion chamber 210. The injector 225 may be arranged to face the nozzle 212 of the rotation shaft 21. The injector 225 discharges the flame toward the fuel injected from the nozzle 212 so that the main combustion chamber 210 may be reignited when the main combustion chamber 210 is in a flameout.

The controller 250 may control opening and shutting off of at least one of the opening/shutting valve 224, the first valve 231, and the second valve 232, by using a valve opening control signal 205. Furthermore, the controller 250 may check whether a flameout occurs in a main combustion room 211 by receiving a flameout sensing signal 206 from a first sensor 215. Furthermore, the controller 250 is connected to the ignition plug 223, and may control to generate a flame in the sub-combustion chamber 220.

Figure 3:
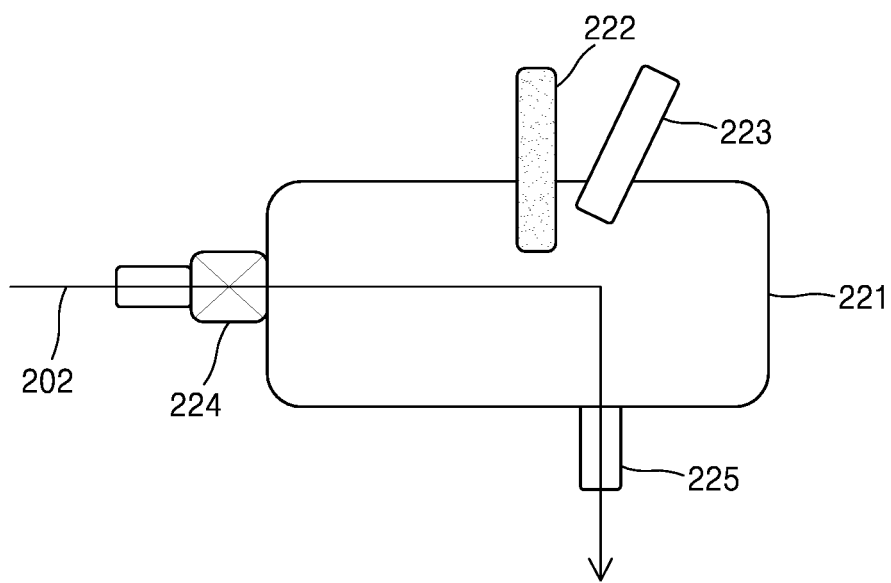
FIGS. 3 and 4 are conceptual diagrams illustrating an operation of a sub-combustion chamber of FIG. 2, according to exemplary embodiments.
Figure 4:
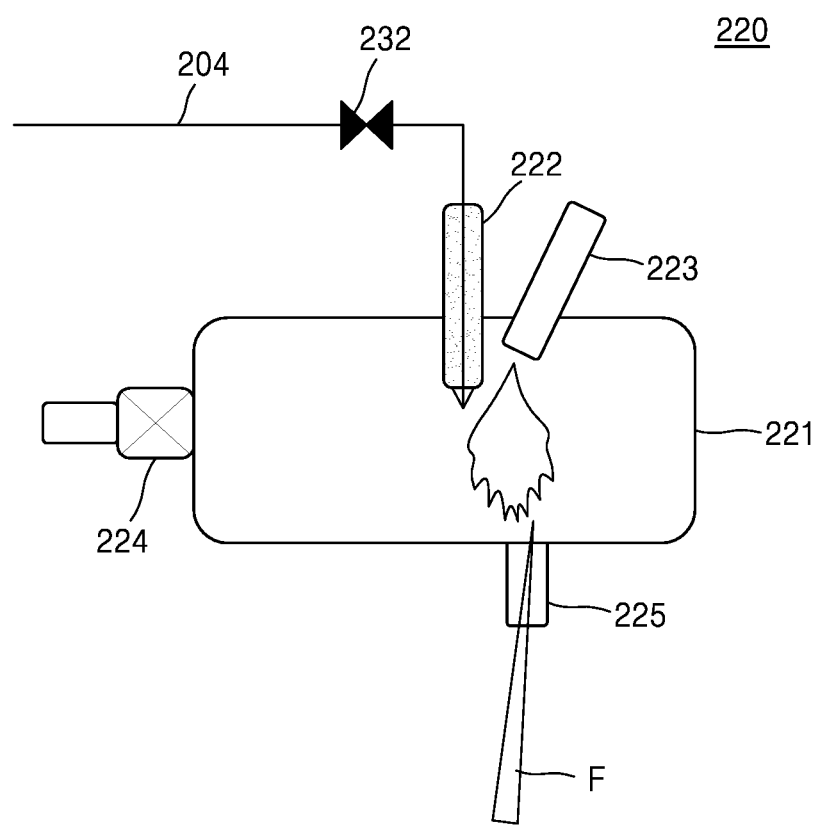

FIGS. 3 and 4 are conceptual diagrams illustrating an operation of the sub-combustion chamber 220 of FIG. 2, according to exemplary embodiments.

Referring to FIG. 3, during the combustion in the main combustion chamber 210, the compressed air may be supplied to the main combustion chamber 210 by passing through the sub-combustion chamber 220.

In the slinger combustor 20, the fuel injected from the rotation shaft 21 is ignited by using an ignition plug (not shown), and thus a fluid of high-temperature and high-pressure generated by combustion is supplied to the turbine 30 to generate a driving force. The rotation shaft 21 is rotated at high speed by the driving force generated by the turbine 30. For example, the gas turbine engine system 1 applied to airplanes rotates at rotation speed of about 50,000 rpm or more.

During the combustion in the main combustion chamber 210, the compressed air is supplied to the main combustion chamber 210 by passing through the sub-combustion chamber 220. The controller 250 may control a degree of opening of the opening/shutting valve 224 and the second valve 232 by using the valve opening control signal 205. The valve opening control signal 205 opens the opening/shutting valve 224 so that the compressed air is supplied to the sub-combustion room 221. Furthermore, the valve opening control signal 205 cuts off the supply of fuel by shutting off the second valve 232. The supplied compressed air may be moved to the main combustion chamber 210 by passing through the injector 225.

Referring to FIG. 4, when a flameout occurs in the main combustion chamber 210, that is, combustion is stopped, a flame F is generated in the sub-combustion chamber 220 and the generated flame F may be discharged to the main combustion chamber 210 so that reignition may occur.

A flameout may be generated after ignition occurs in the slinger combustor 20. In the main combustion chamber 210, the compressed air of high-temperature and high-pressure is moved toward the turbine 30. As a large amount of the compressed air moves, the flame in the main combustion chamber 210 is moved toward the turbine 30, and thus a flameout occurs in the slinger combustor 20. Furthermore, a flameout may occur due to a flow of atmosphere when an airplane flies at a high altitude.

In a related art, the rotation speed of a rotation shaft is reduced for the reignition of a combustor, and an ignition plug is used again. The reignition occurs by reducing the rotation speed of the rotation shaft to about 10% of the rotation speed during the operation of the combustor. In this case, a time delay is generated in a process of decreasing and increasing the rotation speed of the rotation shaft and energy is wasted away.

In the slinger combustor 20 according to the present exemplary embodiment, since the flame F may be generated in the sub-combustion chamber 220, even when a flameout occurs in the main combustion chamber 210, reignition may be generated while the rotation speed of the rotation shaft 21 is maintained.

In detail, the first sensor 215 may sense whether a flameout occurs in the main combustion chamber 210. The controller 250 may receive the flameout sensing signal 206 from the first sensor 215. Then, the controller 250 may control a degree of opening of the opening/shutting valve 224 and the second valve 232 by using the valve opening control signal 205. The valve opening control signal 205 shuts off the opening/shutting valve 224 and opens the second valve 232. Also, the supply of the compressed air to the sub-combustion room 221 is cut off, and the fuel is supplied to the sub-combustion room 221 from the second fuel line 204.

In this state, the controller 250 sends the ignition signal 207 to the ignition plug 223 to generate a flame in the sub-combustion room 221. The supplied compressed air is stored in the sub-combustion room 221, the fuel injection part 222 injects the fuel, and thus a flame may be generated by sparks of the ignition plug 223.

The generated flame F may be supplied to the main combustion chamber 210 by passing through the injector 225. In particular, since the injector 225 is arranged to face the nozzle 212, the flame F may be discharged toward the fuel injected from the nozzle 212. Also, since the discharged flame F is reignited by meeting the fuel, the slinger combustor 20 may be reignited at a high speed rotation speed, without changing the rotation speed of the rotation shaft 21.

After the reignition, the controller 250 opens the opening/shutting valve 224 and shuts off the second valve 232 again, so that the compressed air may be moved toward the main combustion chamber 210 by passing through the sub-combustion chamber 220, thereby cooling the sub-combustion room 221.

In the slinger combustor 20 according to the present exemplary embodiment and the gas turbine engine system 1 including the slinger combustor 20, reignition may occur while a driving state of the slinger combustor 20 is maintained. In particular, since the reignition may occur without changing the rotation speed of the rotation shaft 21 of the slinger combustor 20, reignition may rapidly occur when a flameout occurs and waste of energy may be reduced.

In the slinger combustor 20 according to the present exemplary embodiment and the gas turbine engine system 1 including the slinger combustor 20, by selectively controlling a degree of value opening of the sub-combustion chamber 220, reignition may occur in the main combustion chamber 210 and thus the sub-combustion chamber 220 may be cooled down.

It should be understood that the exemplary embodiments described herein should be considered in a descriptive sense only and not for purposes of limitation. Descriptions of the features or aspects within each exemplary embodiment should typically be considered as available for other similar features or aspects in other exemplary embodiments including the above exemplary embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A slinger combustor comprising:
    a first compressed air line connected to a compressor and configured to supply compressed air, including a first compressed air portion and a second compressed air portion;
    a first fuel line connected to a fuel storage and configured to supply fuel, including a first fuel portion and a second fuel portion;
    a rotation shaft configured to rotate and inject the fuel supplied from the first fuel line;
    a main combustion chamber configured to receive the fuel injected from the rotation shaft and receive the first compressed air portion from the first compressed air line;

a sub-combustion chamber configured to selectively discharge a flame generated in the sub-combustion chamber to the main combustion chamber; at least one valve through which the first fuel portion is supplied to the main combustion chamber and at least one other valve through which the second fuel portion is supplied to the sub-combustion chamber;

an opening/shutting valve through which the second compressed air portion is supplied to the sub-combustion chamber separately from the second fuel portion such that the second compressed air portion first contacts the second fuel portion within the sub-combustion chamber, the second compressed air portion comprising all the compressed air being supplied to the sub-combustion chamber; and a controller comprising at least one processor, the processor configured to:

open the opening/shutting valve to supply the second compressed air portion to the sub-combustion chamber and shut off the at least one other valve to cut off the supply of the second fuel portion to the sub-combustion chamber, during combustion in the main combustion chamber; and shut off the opening/shutting valve to cut off the supply of the second compressed air portion to the sub-combustion chamber and open the at least one other valve to supply the second fuel portion to the sub-combustion chamber while the opening/shutting valve is shut off, based on sensing occurrence of a flameout in the main combustion chamber, so that the flame is generated in the sub-combustion chamber and discharged to the main combustion chamber for re-ignition; and wherein after the flame is generated in the sub-combustion chamber which stored the second compressed air portion for the re-ignition, the flame is discharged by an injector while rotation speed of the rotation shaft is maintained.

2. The slinger combustor of claim 1, wherein, during the combustion in the main combustion chamber, the second compressed air portion is supplied to the main combustion chamber by passing through the sub-combustion chamber, and during the flameout in the main combustion chamber, the sub-combustion chamber generates the flame and discharges the flame to the main combustion chamber.

3. The slinger combustor of claim 2, wherein the flame discharged to the main combustion chamber generates the re-ignition in the main combustion chamber at a moment of sensing the occurrence of the flameout while the rotation speed of the rotation shaft is not changed at the moment of sensing the occurrence of the flameout from a moment before sensing the occurrence of the flameout.

4. The slinger combustor of claim 1, further comprising:

a second compressed air line having one end branched from the first compressed air line and an opposite end connected to the sub-combustion chamber; and a second fuel line having one end branched from the first fuel line and an opposite end connected to the sub-combustion chamber.

5. The slinger combustor of claim 1, wherein the sub-combustion chamber is arranged to face a nozzle of the rotation shaft for injecting the fuel.

6. The slinger combustor of claim 1, wherein the sub-combustion chamber comprises
an ignition plug configured to generate the flame.

7. A gas turbine engine system comprising:
the slinger combustor of claim 1;
the compressor;
the fuel storage arranged spaced apart from the compressor; and
a turbine connected to an outlet of the slinger combustor.

* * * * *